Figure 3:
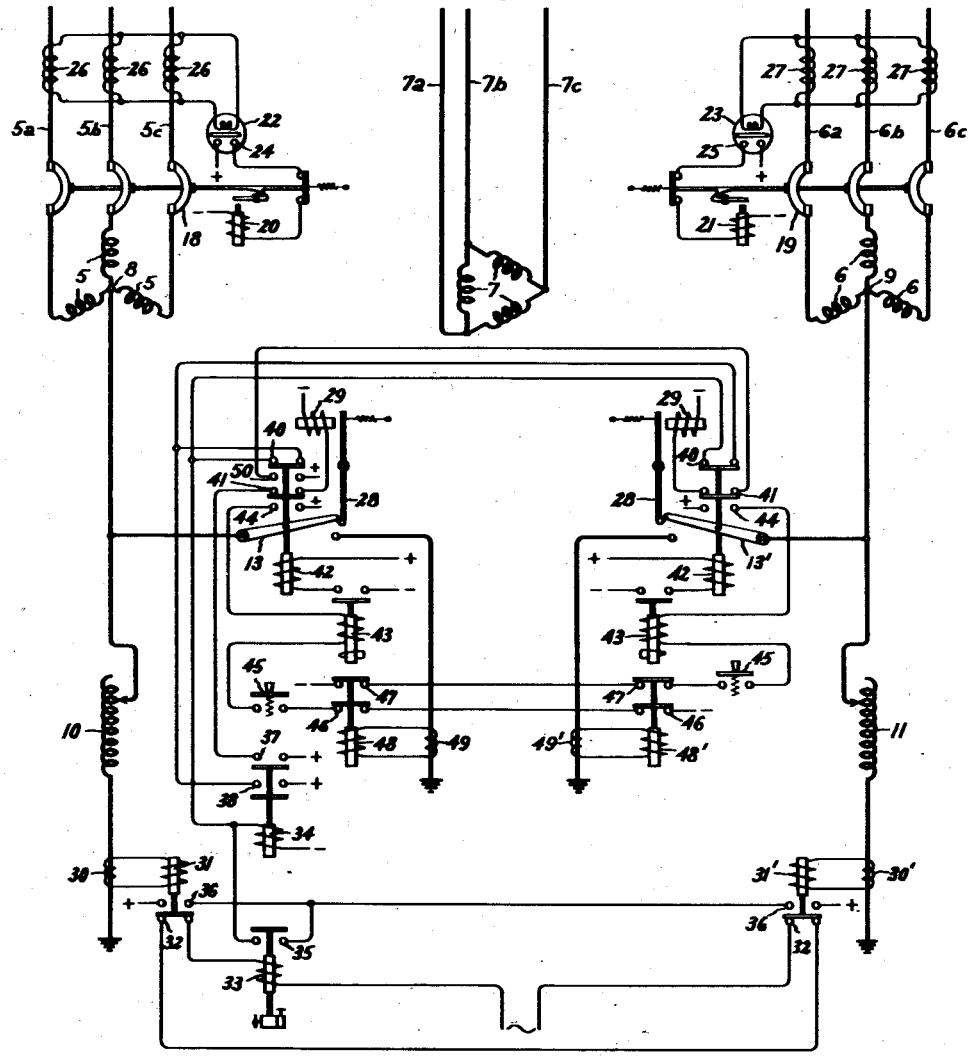

Sept. 15, 1942. S. B. FARNHAM 2,296,099
PROTECTION OF ALTERNATING-CURRENT ELECTRIC POWER SYSTEMS
Filed Dec. 31, 1941   3 Sheets-Sheet 1
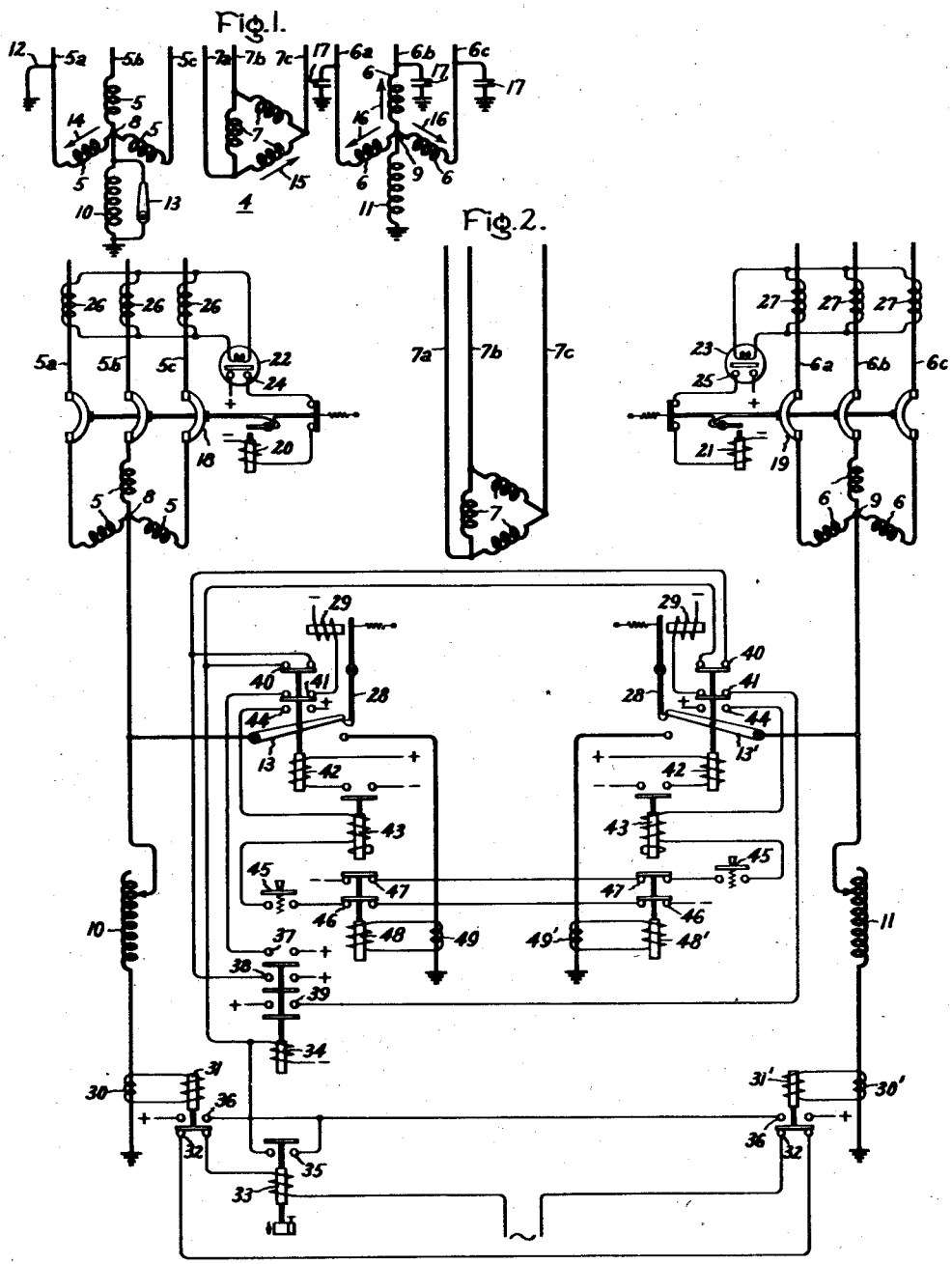
Inventor:
Sherman B. Farnham,
by Harry E. Dunham
His Attorney.

Patented Sept. 15, 1942

2,296,099

UNITED STATES PATENT OFFICE 2,296,099

PROTECTION OF ALTERNATING CURRENT ELECTRIC POWER SYSTEMS

Sherman B. Farnham, Schenectady, N. Y., assignor to General Electric Company, a corporation of New York Application December 31, 1941, Serial No. 425,095

13 Claims. (Cl. 171—97.)

My invention relates to improvements in the protection of alternating current electric power systems, and especially systems which include a polyphase multiwinding transformer or a bank of single phase multiwinding transformers having a low zero-phase sequence reactance relatively to the positive-phase sequence magnetizing reactance and at least two sets of star-connected windings to at least one set of which there is connected a circuit of the type wherein a fault to ground on a phase conductor of the circuit substantially increases the capacitance current to ground of the ungrounded phase conductors and wherein it is desired to ground the other set of windings either directly or through an impedance.

In power systems which operate without a neutral point grounded more or less directly, single conductor to ground faults of a transitory of arcing character may be suppressed by a ground fault neutralizing device, as disclosed in United States Letters Patent 1,537,371, without interruption of service. Since a large percentage of the faults on alternating current electric systems involve initially, at least, only a single conductor to ground, such neutralizing device materially improves the service continuity factor. The neutralizing device is usually connected between a neutral point of the system and ground and proportioned to have together with the transformer affording the neutral point, a zero-phase sequence inductance such as to provide on the occurrence of a ground on a phase conductor of the system a lagging current for effectively suppressing the capacitance current to ground of the ungrounded phase conductors. Usually the amount of the inductance furnished by the transformer in the neutralizer connection is a small proportion of the total inductance in this connection. In order to take care of faults which the ground fault neutralizer cannot suppress, a low impedance connection to ground may be established after the flow of lagging current in the neutralizer connection for a predetermined time without suppressing the ground fault, as disclosed in United States Letters Patent 1,378,557. This low impedance connection allows sufficient flow of fault current to insure the intended operation of ground fault responsive relays with which the system is usually provided to clear permanent ground faults. Of course, when this low impedance connection is established, there is a relatively heavy current flow in comparison with the lagging current flow. If the neutral point to which the ground fault neutralizer is connected is in a transformer comprising, for example, two sets of Y-connected windings and a set of delta-connected windings and the zero-phase sequence reactance of the transformer is low relatively to the positive-phase sequence magnetizing reactance or, in other words, if the current to ground in case of single conductor to ground faults is high relatively to the magnetizing current of the transformer, then the mutual coupling between the windings induces voltages in the windings of the other Y-connected set. If there is a ground fault neutralizer connected between the neutral point of this other set of Y-connected windings and ground, then since the resultant capacitance to ground of each of the phase conductors of the circuit connected to this other set of Y-connected windings and the ground fault neutralizer are in resonance, such relatively high voltages may be produced as to impair the system insulation. If the neutral point of the first set of Y-connected windings is normally operated with a low impedance ground connection, and the other set of Y-connected windings is normally operated with the ground fault neutralizer connection, then the same condition will prevail on the occurrence of a ground fault on the phase conductor of the circuit connected to the first set of Y-connected windings. This situation becomes especially critical when it is desired to change from a directly grounded system to a system using the ground fault neutralizer because any three-winding transformers already installed are likely to have been built without any consideration to the necessity for correctly proportioning the zero-phase sequence reactances. Likewise, the situation also requires careful study even in the installation of new apparatus if the transformer is built by someone other than the one who builds the ground fault neutralizer and who consequently is not in a position to select or determine the reactance characteristics of the transformer. The insulation breakdown possibilities mentioned may occur also in a polyphase core type transformer mounted in one tank and having two sets of Y-connected windings since in such a transformer the core and tank may furnish such a low reluctance path for the zero-phase sequence flux that the transformer has relatively low impedance to the currents flowing to ground.

One object of my invention is to provide an improved arrangement for protecting a polyphase alternating current system so that ground fault neutralizers may safely be used in connection with transformers such, for example, as those mentioned wherein the proportioning of the transformer reactances results in such mutual coupling as to endanger the system insulation on the occurrence of a ground fault on the system. This and other objects of my invention will appear in more detail hereinafter.

In accordance with my invention, I provide for a polyphase alternating current system comprising a transformer having at least two sets of star-connected windings and a low zero-phase sequence reactance relatively to its positive-phase sequence magnetizing current and two polyphase circuits respectively connected to said sets of windings, a protective arrangement whereby the star point of each set may normally be connected to ground through a ground fault neutralizer which can be by-passed on the occurrence of non-transitory grounds without danger to the insulation of the parts of the system metallically connected to the transformer. Further in accordance with my invention, I may by-pass both ground fault neutralizers substantially simultaneously. However, in practice, if there is any chance that the by-passes may not be established sufficiently closely together, I may, regardless of which circuit is faulty, first close the by-pass on the ground fault neutralizer associated with the circuit which is liable to overstressing of its insulation and then close the by-pass on the other ground fault neutralizer. Also, in accordance with my invention, I may, in some cases, use this sequential closing of the by-pass for a fault on the circuit whose heavy fault current would overstress the insulation of the other circuit, but if the fault is on the circuit whose fault current is small relatively to the rating of the ground fault neutralizer on the other circuit, then I may close only the by-pass on the faulted circuit.

By the term "star-connected," I mean to include the connection commonly referred to as the zigzag connection. Also, wherever a multiplicity of polyphase windings is mentioned herein, it is to be understood that they may be star or zigzag or any combination of these two types of windings.

My invention will be better understood from the following description when considered in connection with the accompanying three sheets of drawings, and its scope will be pointed out in the appended claims.

Figure 4:
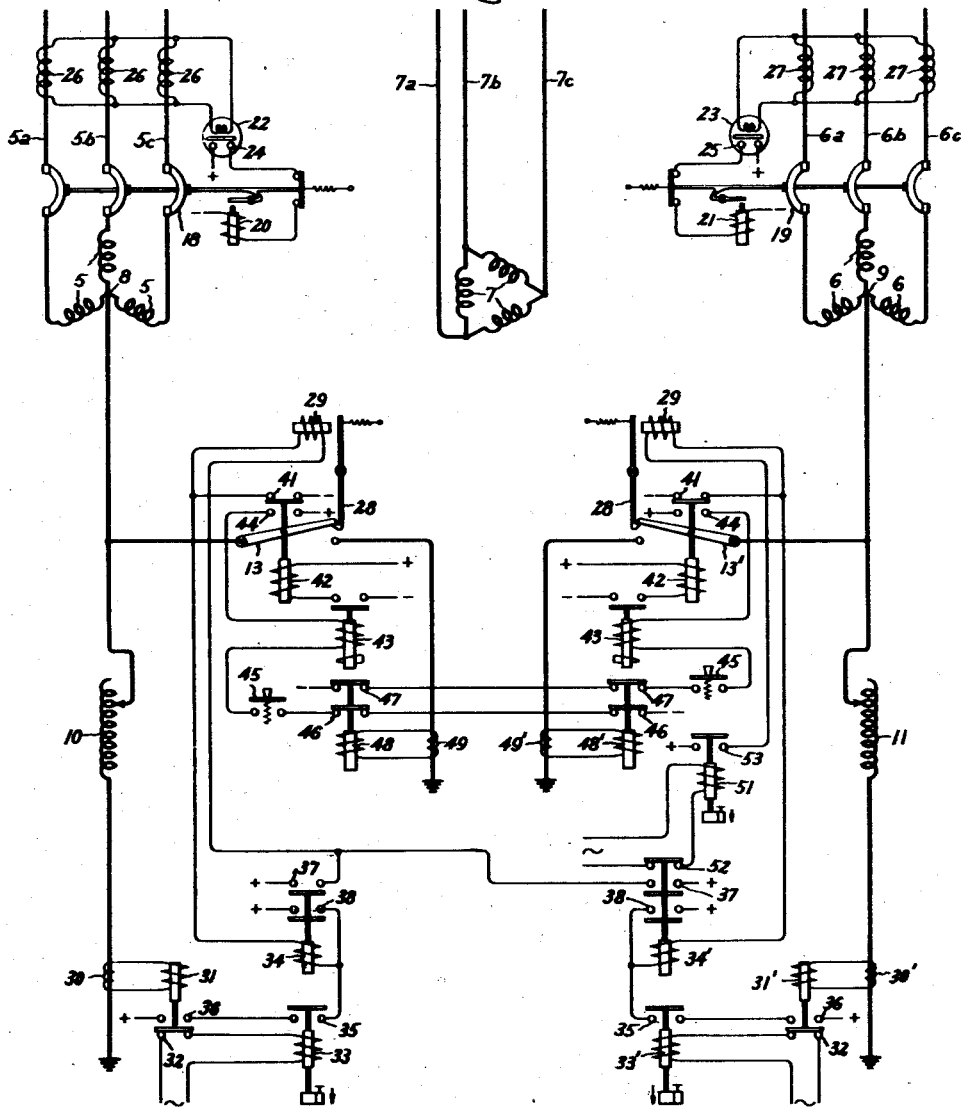

In the accompanying three sheets of drawings, Fig. 1 is a schematic circuit diagram of a three-phase alternating current system embodying a Y-delta-Y-connected power transformer provided with ground fault neutralizers; Fig. 2 diagrammatically illustrates an embodiment of my invention wherein both ground fault neutralizers are by-passed substantially simultaneously; Fig. 3 illustrates another embodiment of my invention wherein the ground fault neutralizers are by-passed sequentially in the same order, regardless of which circuit is at fault; and Fig. 4 diagrammatically illustrates a modification of the embodiment of my invention shown in Fig. 3.

Fig. 1 is a schematic diagram illustrating a three-phase alternating current electric power system comprising a multiwinding power transformer 4 having two sets of Y-connected windings 5 and 6 and a set of delta-connected windings 7. This transformer may be a polyphase transformer or a bank of single-phase transformers. To the windings 5 and 6 there are respectively connected by suitable means, not shown, the phase conductors 5a, 5b, 5c, and 6a, 6b, 6c of two three-phase circuits. To the windings 7 there may also be connected by suitable means, not shown, the phase conductors 7a, 7b, 7c of another three-phase circuit, but this is immaterial to my invention. The two sets of Y-connected windings 5 and 6 have neutral points 8 and 9 respectively, which are shown connected to ground through ground fault neutralizers 10 and 11 respectively. A ground fault of a non-transitory character is indicated at 12 on the phase conductor 5a, and it is assumed that the ground fault neutralizer 10 has been by-passed by the closing of a switch 13 a predetermined time after the occurrence of the fault which the ground fault neutralizer 10 has been unable to suppress.

With the closing of the switch 13, there will be a heavy flow of fault current to ground, as indicated by the arrow 14, in a circuit including the grounded winding 5, the conductor 5a, the fault 12 and return through the ground fault neutralizer by-pass switch 13. This current flow induces a voltage in the corresponding phase of the delta-connected windings 7. This voltage causes a current, indicated by the arrow 15, to circulate in each of the windings 7. This circulating current in turn induces in the windings 6 in-phase voltages which cause in-phase currents, indicated by the arrows 16, to flow in these windings. These in-phase currents 16 flow in parallel circuits including the respective phase conductors 6a, 6b, 6c, their capacitances 17 to ground and return through the ground fault neutralizer 11. Since in these parallel paths the capacitances 17 and the reactance of the neutralizer 11 are such that each path is a series resonant circuit, it is obvious that such heavy voltages may occur across the neutralizer 11 as to endanger not only the neutralizer but, also, any part of the system metallically connected to the windings 6 because of the rise in potential of the neutral point 9. Of course, as far as the insulation danger above-outlined is concerned, it is, in general, immaterial whether the ground fault occurs on a phase conductor associated with the circuit connected to the windings 5 or a phase conductor of the circuit connected to the windings 6. From the foregoing, it will also be obvious that if the windings 5, for example, were normally operated with the neutral point 8 substantially directly connected to ground, as is the case with the switch 13 closed, and the neutral point 9 with the ground fault neutralizer 11, then the same overstressing of the insulation of the parts metallically connected to the windings 6 can occur in case of a ground fault on the circuit connected to the windings 5.

Fom the foregoing, it will also be observed that upon the occurrence of a ground fault on one phase conductor of a circuit connected to a set of Y-connected windings there exists, with the neutral of these windings connected substantially directly to ground, a relatively low reactance path for ground fault current flow and a path for each of the resulting mutually induced currents in each of the other two sets of windings. The relative reactances of these paths will determine the magnitudes of the voltage stresses and the consequent insulation danger. Thus, if the reactance of the delta-connected windings 7 were zero or so small that only a current small in comparison to the rating of the neutralizer 11 would flow in this neutralizer, there would be no overstressing of the insulation. As the reactance of the windings 7 increases, the mutual effects become greater, and something must be done to avoid overstressing the insulation. In general, if the zero-phase sequence reactance of a multiwinding transformer comprising at least two sets of star-connected windings is low relatively to its positive-phase sequence magnetizing reactance, then there is danger of overstressing the insulation on the occurrence of a ground fault on a phase conductor of the circuit connected to one set of star-connected windings when the star point of this set is connected substantially directly to ground and a ground fault neutralizer is connected in the star point of the other set of star-connected windings. Stated in another way, if the transformer construction is such that on the occurrence of a ground fault on the circuit connected to one set of star-connected windings, there may flow when the star point of this set is connected directly to ground a large fault current relatively to the transformer magnetizing current, then there is danger of overstressing the insulation if the neutral point of the other star-connected set is connected to ground through a ground fault neutralizer.

In some cases, this overstressing of the insulation may occur in a transformer having only two sets of windings, each star-connected. Thus, for example, in a Y-Y-connected polyphase core type transformer mounted in one tank, the core and tank may furnish a low reluctance path for the flux due to the flow of ground fault current in the case of a ground fault on a phase conductor of the circuit connected to one set of windings. Under such conditions, the transformer reactance may be low enough for the mutually induced currents in the other set of windings to assume dangerous values if a ground fault neutralizer is connected in the neutral point of this other set of Y-connected windings.

Referring now to the embodiment of my invention diagramatically illustrated in Fig. 2, I have shown, as in Fig. 1, part of a three-phase alternating current electric power system comprising a multiwinding power transformer having two Y-connected sets of windings 5 and 6. To these are connected through suitable circuit interrupting means 18 and 19 circuits having phase conductors 5a, 5b, 5c and 6a, 6b, 6c. This power transformer also includes the delta-connected set of windings 7 to which there may be connected a circuit comprising phase conductors 7a, 7b, 7c by suitable means, not shown. The circuit interrupters 18 and 19 are illustrated as latched closed circuit breakers respectively having trip coils 20 and 21. For effecting the opening of the circuit breakers 18 and 19 in response to ground faults on the circuits which they control, it is usual to provide ground fault responsive relaying means, herein illustrated simply as overcurrent relays 22 and 23 having normally open contacts 24 and 25 respectively in the circuits of the trip coils 20 and 21 respectively. For response to the flow of ground fault current, the relays 22 and 23 may be connected in circuit with the parallel-connected current transformers 26 and 27 connected in series relation with the phase conductors 5a, 5b, 5c and 6a, 6b, 6c respectively.

For suppressing transitory faults to ground on a phase conductor of the circuit 5a, 5b, 5c or 6a, 6b, 6c, these circuits are respectively provided with ground fault neutralizers 10 and 11 which are connected between ground and the neutral points 8 and 9 respectively. Each of these neutralizers is proportioned to have together with the associated transformer windings a zero-phase sequence inductance such as to provide, on the occurrence of a ground on a phase conductor of the circuit connected to the star-connected windings to whose star point the neutralizer is connected, a lagging current for effectively suppressing the capacitance current to ground at the grounded point. These neutralizers may be adjustable, as shown, so as to be tuned in accordance with the amount of the system in service and in direct metallic connection with the circuits which they serve.

The ground fault neutralizers 10 and 11 will suppress transitory faults to ground on circuits 5a, 5b, 5c and 6a, 6b, 6c respectively, but in order that the system ground fault relaying means, shown in part by the relays 22 and 23, may take care of non-transitory ground faults, I arrange, in accordance with my invention, to establish a low impedance path to ground from the neutral point of the windings associated with the faulty circuit. Further in accordance with one embodiment of my invention, I arrange to establish at the same time a low impedance path to ground from the neutral point of the windings associated with the other circuit so as to avoid overstressing the insulation of parts in direct metallic connection with these windings, as pointed out in connection with Fig. 1. For establishing such low impedance connections to ground I provide, as shown in Fig. 2, for the windings 5 and 6 grounding switches 13 and 13', and I arrange to close them as nearly simultaneously as possible a predetermined time after the occurrence of a ground on a phase conductor of either of the circuits without suppression of the ground by the associated ground fault neutralizer. Since, in general, two such switches cannot be closed simultaneously, this arrangement should be applied only to systems whose insulation would not be materially impaired during the possible time interval between the closing of the two grounding switches. As illustrated in Fig. 2, these grounding switches are of the latched open, biased to close type and include a latch 28 and a trip coil 29.

In order to control the grounding switches 13 and 13' so as to effect their closing as nearly simultaneously as possible, I so arrange as to cause the energization of the trip coils simultaneously in response to the flow of current through either of the neutralizers 10 or 11 for a predetermined time. For this purpose, I provide in series relation with the neutralizers 10 and 11 through suitable means, such as current transformers 30, 30', relays 31, 31' respectively, which respond to currents above predetermined values in these neutralizers. In general, the predetermined current value will be different for each neutralizer. Each of these relays 31, 31' through its normally closed contacts 32 in series with the winding of a time delay dropout relay 33 controls the energization of this relay. The relay 33 may be of the induction disk alternating current energized type, examples of which are well known to the art.

In order to avoid the tripping of a grounding switch unless current above a predetermined value flows in at least one of the ground fault neutralizers for a predetermined time, each of the relays 31, 31' is arranged in conjunction with the relay 33 to control the closing of the grounding switches. For this purpose, I provide, as shown, an auxiliary tripping relay 34 whose winding is in series relation with the normally open contacts 35 of the time delay relay 32 and in series relation with the parallel-connected normally open contacts 36 of the relays 31 and 31'. The auxiliary tripping relay 34 has normally open contacts 37, 38 and 39. The contacts 38 are arranged to complete a holding circuit for the relay 34 through the parallel-connected "b" contacts 40 of the grounding switches 13, 13'. The contacts 37 are arranged to complete the circuit of the trip coil 29 of the switch 13 through the "b" contacts 41 of this switch. The contacts 39 are arranged to complete the circuit of the trip coil 29 of the switch 13' through the "b" contacts 41 of this switch.

In order to open the switches 13, 13' after the clearing of a ground fault, each is provided with an opening means indicated as a winding 42, the circuit of which is controlled by a relay 43, shown as of the hesitating control type so as to insure latching of the switch in the open position. The circuit of the relay 43 includes in series the "a" contacts 44 of the associated grounding switch, a control switch 45 which may be manually operated. Further, in order to prevent the opening of either of the switches 13 or 13' while they are carrying current above a predetermined value, the opening control circuits for the switches 13, 13' include in series the normally closed contacts 46 and 47 respectively of relays 48 and 48' which are respectively responsive to the current flowing in the ground connections through the switches 13, 13'. For this purpose, these relays 48, 48' may be connected in circuit with suitable means, such as current transformers 49, 49' in the ground connections through the switches.

With this arrangement, it will be obvious that whenever there is a fault to ground on a phase conductor of either of the circuits 5a, 5b, 5c or 6a, 6b, 6c the associated ground fault neutralizer 10 or 11 will suppress the fault if it is of a transitory character. If not, then after a predetermined time the relay 33, which has been deenergized in response to the operation of the relay 31 or 31' associated with the faulty circuit, will effect the operation of the auxiliary relay 34. This relay completes a holding circuit for itself through its contacts 38 and, through its contacts 37 and 39, effects the closing of the switches 13, 13' so that the ground fault relaying of the faulty circuit may function to clear the fault. With the direct grounding of the neutral point of the sound circuit, there is no series resonant path for currents in the star-connected windings associated with the sound circuit since the ground fault neutralizer associated with this circuit is by-passed directly to ground. The neutral point of the windings associated with the faulty circuit may be raised slightly in potential due to the reactance of the polygonally-connected windings 7, but this will not decrease the flow of ground fault current in the direct neutral to ground connection of the faulty circuit sufficiently to prevent the correct operation of the ground fault relaying means of this faulty circuit.

If the insulation of the parts directly metallically connected to one circuit cannot safely withstand the resonant voltages consequent upon a single conductor to ground fault on the other circuit with the ground fault neutralizer thereof by-passed, but the insulation of the parts directly metallically connected to the other circuit can safely withstand the voltages occurring on the occurrence of a single conductor to ground fault on the first circuit with its neutral by-passed, then the danger from lack of simultaneous closing of the grounding switches of the two circuits can be eliminated by using the embodiment of my invention shown in Fig. 3. In this embodiment of my invention, it is assumed that the parts directly metallically connected to the circuit 5a, 5b, 5c cannot safely withstand the voltages that would occur when there is a fault to ground on one of the phase conductors of the circuit 6a, 6b, 6c and the grounding switch 13' thereof is closed. It is further assumed, however, that the parts directly metallically connected to the circuit 6a, 6b, 6c can safely withstand the voltages that may occur when there is a ground fault on the circuit 5a, 5b, 5c and the grounding switch 13 is closed. Under such conditions, I provide, in accordance with my invention, an arrangement whereby the grounding switch 13 is closed first, regardless of whether the fault is on the circuit 6a, 6b, 6c or 5a, 5b, 5c, and after the closing of this switch, the grounding switch 13' is closed. For this purpose, the circuit closing contacts 37 of the auxiliary tripping relay 34 are arranged directly to control the circuit of the trip coil 29 of the switch 13, but the tripping of the switch 13' is made dependent upon the closing of the switch 13. For this purpose, the switch 13 is provided with auxiliary "a" contacts 50, which are arranged in series with the auxiliary "b" contacts 41 and the trip coil 29 of the grounding switch 13'. With this arrangement, it will be apparent that no matter which circuit is involved in a non-transitory ground fault the grounding switches will always be closed in a predetermined sequence such that no danger can result to the system parts which could be harmed by the series resonant condition possible upon the direct grounding of the circuit connected to the other neutralizer when there is a ground fault on this latter circuit.

Instead of always closing both grounding switches in a predetermined sequence, as in the arrangement shown in Fig. 3, I may close the grounding switch of the neutralizer of the circuit unable to withstand the voltages consequent upon the ground current flow resulting from the by-passing of the neutralizer associated with the other circuit when it is subjected to a non-transitory ground, but in case of a non-transitory ground on the circuit with which the weaker insulation is associated, then I may by-pass the neutralizer, associated with this circuit first, and then the other neutralizer. Such an embodiment of my invention is illustrated in Fig. 4. In this embodiment it is again assumed that the insulation of the circuit 5a, 5b, 5c cannot withstand the voltages consequent upon the ground current which would tend to flow following the by-passing of the neutralizer 11 in the event of a non-transitory ground on the circuit 6a, 6b, 6c, but that the insulation of the circuit 6a, 6b, 6c can withstand the voltages consequent upon the ground current which would flow following the by-passing of the neutralizer 10 in the event of a non-transitory ground on the circuit 5a, 5b, 5c.

In the arrangement shown in Fig. 4 the time delay dropout relay 33 is deenergized by the opening of the contacts 32 of the relay 31 in response to flow of current above a predetermined value in the ground fault neutralizer 10. When the relay 33 closes its contacts 35 while the contacts 36 of the relay 31 are closed, the auxiliary tripping relay 34 is energized. This relay thereupon completes a holding circuit for itself through its circuit closing contacts 36 and, also, completes the circuit of the trip coil 29 of the grounding switch 13 through its circuit closing contacts 37 to effect the closing of this grounding switch. The grounding switch 13', however, remains open.

If a non-transitory ground fault occurs on the circuit 6a, 6b, 6c, then the relay 31' operates in response to a predetermined flow of current in the neutralizer 11 to effect the deenergization of the time delay dropout relay 33' having circuit closing contacts 35. When the contacts 35 of this relay close while the contacts 36 of the relay 31' are closed, the energization of a second auxiliary tripping relay 34' is effected. This relay completes a holding circuit for itself through its circuit closing contacts 36 and, also, through its circuit closing contacts 37 completes the circuit of the trip coil 29 of the grounding switch 13 to effect the closing thereof. In order to delay the tripping of the grounding switch 13' until the grounding switch 13 is closed, suitable means are provided, such as a supplementary time delay dropout relay 51, which is under the control of the circuit opening contacts 52 of the relay 34' and which through its circuit closing contacts 53 controls the circuit of the trip coil 29 of the switch 13'. In other words, on the occurrence of a non-transitory ground fault on a phase conductor of the circuit 6a, 6b, 6c, only the grounding switch 13 is closed, but on the occurrence of a ground fault on a phase conductor of the circuit 6a, 6b, 6c, both grounding switches 13, 13' are closed in a predetermined order with the closing of the grounding switch 13' delayed sufficiently to insure that the grounding switch 13 is first closed.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States, is:

1. In a polyphase alternating current system of the type wherein a fault to ground on one phase conductor of a circuit of the system substantially increases the capacitance current to ground of the ungrounded phase conductors of the circuit, a multiwinding transformer having a low zero-phase sequence reactance relatively to its positive phase sequence magnetizing reactance and at least two sets of star-connected windings, two polyphase circuits respectively connected to said sets of star-connected windings, two inductive devices respectively connected between the star points of said star-connected windings and ground, each of said devices being proportioned to have together with the transformer a zero-phase sequence inductance such as to provide on the occurrence of a ground on a phase conductor of the circuit connected to the star-connected windings to whose star point the device is connected a lagging current for effectively suppressing the capacitance current to ground at the grounded point, switching means for establishing a low impedance connection to ground from the star points of said star-connected windings and means operative in dependence on the current flowing in the particular inductive device associated with the transformer windings to which the faulted conductor is connected a predetermined time after the occurrence of a ground fault which is not suppressed by the lagging current flowing in the particular inductive device for initiating the closure of all of said switching means when the ground fault occurs on one of said circuits and at least one of the switching means when the ground fault occurs on the other of said circuits.

2. In a polyphase alternating current system of the type wherein a fault to ground on one phase conductor of a circuit of the system substantially increases the capacitance current to ground of the ungrounded phase conductors of the circuit, a multiwinding transformer having a low zero-phase sequence reactance relatively to its positive phase sequence magnetizing reactance and at least two sets of star-connected windings, two polyphase circuits respectively connected to said sets of star-connected windings, two inductive devices respectively connected between the star points of said star-connected windings and ground, each of said devices being proportioned to have together with the transformer a zero-phase sequence inductance such as to provide on the occurrence of a ground on a phase conductor of the circuit connected to the Y-connected windings to whose neutral point the device is connected, a lagging current for effectively suppressing the capacitance current to ground at the grounded point, means for establishing a low impedance connection to ground from the star points of the star-connected windings including means operative in dependence on the current flowing in the particular inductive device associated with the transformer windings to which the faulted conductor is connected a predetermined time after the occurrence of a ground fault which is not suppressed by the lagging current flowing in the particular inductive device for substantially simultaneously effecting the completion of said low impedance connections when the ground fault occurs on either of said circuits.

3. In a polyphase alternating current system of the type wherein a fault to ground on one phase conductor of a circuit of the system substantially increases the capacitance current to ground of the ungrounded phase conductors of the circuit, a multiwinding transformer having a low zero-phase sequence reactance relatively to its positive phase sequence magnetizing reactance and at least two sets of star-connected windings, two polyphase circuits respectively connected to said sets of star-connected windings, two inductive devices respectively connected between the star points of said star-connected windings and ground, each of said devices being proportioned to have together with the transformer a zero-phase sequence inductance such as to provide on the occurrence of a ground on a phase conductor of the circuit connected to the Y-connected windings to whose neutral point the device is connected, a lagging current for effectively suppressing the capacitance current to ground at the grounded point, means for establishing a low impedance connection to ground from the star points of the star-connected windings including means operative in dependence on the current flowing in the particular inductive device associated with the transformer windings to which the faulted conductor is connected a predetermined time after the occurrence of a ground fault which is not suppressed by the lagging current flowing in the particular inductive device for effecting the completion of both of said low impedance connections in a predetermined sequence when the ground fault occurs on either of said circuits.

4. In a polyphase alternating current system of the type wherein a fault to ground on one phase conductor of a circuit of the system substantially increases the capacitance current to ground of the ungrounded phase conductors of the circuit, a multiwinding transformer having a low zero-phase sequence reactance relatively to its positive phase sequence magnetizing reactance and at least two sets of star-connected windings, two polyphase circuits respectively connected to said sets of star-connected windings, two inductive devices respectively connected between the star points of said star-connected windings and ground, each of said devices being proportioned to have together with the transformer a zero-phase sequence inductance such as to provide on the occurrence of a ground on a phase conductor of the circuit connected to the Y-connected windings to whose neutral point the device is connected, a lagging current for effectively suppressing the capacitance current to ground at the grounded point, means for establishing a low impedance connection to ground from the star points of the star-connected windings including means operative in dependence on the current flowing in the particular inductive device associated with the transformer windings to which the faulted conductor is connected a predetermined time after the occurrence of a ground fault which is not suppressed by the lagging current flowing in the particular inductive device for effecting the completion of one of said low impedance connections when the ground fault occurs on one of said circuits and both of said low impedance connections in a predetermined sequence when the ground fault occurs on the other of said circuits.

5. In a polyphase alternating current system of the type wherein a fault to ground on one phase conductor of a circuit of the system substantially increases the capacitance current to ground of the ungrounded phase conductors of the circuit, a multiwinding transformer having at least two sets of star-connected windings and a set of polygonally connected windings, two polyphase circuits respectively connected to said sets of star-connected windings, two inductive devices respectively connected between the star points of said star-connected windings and ground, each of said devices being proportioned to have together with the transformer a zero-phase sequence inductance such as to provide on the occurrence of a ground on a phase conductor of the circuit connected to the star-connected windings to whose star point the device is connected a lagging current for effectively suppressing the capacitance current to ground at the grounded point, switching means for establishing a low impedance connection to ground from the star points of said star-connected windings and means operative in dependence on the current flowing in the particular inductive device associated with the transformer windings to which the faulted conductor is connected a predetermined time after the occurrence of a ground fault which is not suppressed by the lagging current flowing in the particular inductive device for initiating the closure of all of said switching means when the ground fault occurs on one of said circuits and at least one of the switching means when the ground fault occurs on the other of said circuits.

6. In a three-phase alternating current system of the type wherein a fault to ground on one phase conductor of a circuit of the system substantially increases the capacitance current to ground of the ungrounded phase conductors of the circuit, a power transformer having two sets of Y-connected windings and one set of delta-connected windings, two three-phase circuits respectively connected to said sets of Y-connected windings, two inductive devices respectively connected between the neutral points of said Y-connected windings and ground, each of said devices being proportioned to have together with the transformer a zero-phase sequence inductance such as to provide on the occurrence of a ground on a phase conductor of the circuit connected to the Y-connected windings to whose neutral point the device is connected a lagging current for effectively suppressing the capacitance current to ground at the grounded point, switches for establishing a low impedance connection to ground from the neutral points of said Y-connected windings and means operative in dependence on the current flowing in the particular inductive device associated with the transformer windings to which the faulted conductor is connected a predetermined time after the occurrence of a ground fault which is not suppressed by the lagging current flowing in the particular inductive device for initiating the closure of both of said switches when the ground fault occurs on one of said circuits and at least one of the switches when the ground fault occurs on the other of said circuits.

7. In a three-phase alternating current system of the type wherein a fault to ground on one phase conductor of a circuit of the system substantially increases the capacitance current to ground of the ungrounded phase conductors of the circuit, a power transformer having two sets of Y-connected windings and one set of delta-connected windings, two three-phase circuits respectively connected to said sets of Y-connected windings, two inductive devices respectively connected between the neutral points of said Y-connected windings and ground, each of said devices being proportioned to have together with the transformer a zero-phase sequence inductance such as to provide on the occurrence of a ground on a phase conductor of the circuit connected to the Y-connected windings to whose neutral point the device is connected a lagging current for effectively suppressing the capacitance current to ground at the grounded point, switches for establishing a low impedance connection to ground from the neutral points of said Y-connected windings and means operative in dependence on the current flowing in the particular inductive device associated with the transformer windings to which the faulted conductor is connected a predetermined time after the occurrence of a ground fault which is not suppressed by the lagging current flowing in the particular inductive device for simultaneously initiating the closure of both of said switches when the ground fault occurs on either of said circuits.

8. In a three-phase alternating current system of the type wherein a fault to ground on a phase conductor of a circuit of the system substantially increases the capacitance current to ground of the ungrounded phase conductors of the circuit, a power transformer having two sets of Y-connected windings and one set of delta-connected windings, two three-phase circuits respectively connected to said sets of Y-connected windings, two inductive devices respectively connected between the neutral points of said Y-connected windings and ground, each of said devices being proportioned to have together with the transformer a zero-phase sequence inductance such as to provide on the occurrence of a ground on a phase conductor of the circuit connected to the Y-connected windings to whose neutral point the device is connected a lagging current for effectively suppressing the capacitance current to ground at the grounded point, switches for establishing a low impedance connection to ground from the neutral points of said Y-connected windings and means operative in dependence on the current flowing in the particular inductive device associated with the transformer windings to which the faulted conductor is connected a predetermined time after the occurrence of a ground fault which is not suppressed by the lagging current flowing in the particular inductive device for effecting the closure of both of said switches in a predetermined sequence when the ground fault occurs on either of said circuits.

9. In a three-phase alternating current system of the type wherein a fault to ground on one phase conductor of a circuit of the system substantially increases the capacitance current to ground of the ungrounded phase conductors of the circuit, a power transformer having two sets of Y-connected windings and one set of delta-connected windings, two three-phase circuits respectively connected to said sets of Y-connected windings, two inductive devices respectively connected between the neutral points of said Y-connected windings and ground, each of said devices being proportioned to have together with the transformer a zero-phase sequence inductance such as to provide on the occurrence of a ground on a phase conductor of the circuit connected to the Y-connected windings to whose neutral point the device is connected a lagging current for effectively suppressing the capacitance current to ground at the grounded point, switches for establishing a low impedance connection to ground from the neutral points of said Y-connected windings and means operative in dependence on the current flowing in the particular inductive device associated with the transformer windings to which the faulted conductor is connected a predetermined time after the occurrence of a ground fault which is not suppressed by the lagging current flowing in the particular inductive device for effecting the closure of only one of said switches when the ground fault occurs on one of said circuits and both of said switches in a predetermined sequence when the ground fault occurs on the other of said circuits.

10. In a three-phase alternating current system of the type wherein a fault to ground on one phase conductor of a circuit of the system substantially increases the capacitance current to ground of the ungrounded phase conductors of the circuit, a power transformer having two sets of Y-connected windings and one set of delta-connected windings, two three-phase circuits respectively connected to said sets of Y-connected windings, two inductive devices respectively connected between the neutral points of said Y-connected windings and ground, each of said devices being proportioned to have together with the transformer a zero-phase sequence inductance such as to provide on the occurrence of a ground on a phase conductor of the circuit connected to the Y-connected windings to whose neutral point the device is connected a lagging current for effectively suppressing the capacitance current to ground at the grounded point, switches for establishing a low impedance connection to ground from the neutral points of said Y-connected windings and means operative in dependence on the currents flowing in the particular inductive device associated with the transformer windings to which the faulted conductor is connected a predetermined time after the occurrence of a ground fault which is not suppressed by the lagging current flowing in the particular inductive device for effecting the closure of both of said switches on the occurrence of a ground fault on one of said circuits.

11. In combination, two polyphase circuits, two star-connected mutually-coupled windings respectively connected to said circuits, two impedances respectively connected between the star points of said windings and ground, and means dependent upon the current through one of said impedances for simultaneously establishing low impedance circuits between said star points and ground.

12. In combination, two polyphase circuits, two star-connected mutually-coupled windings respectively connected to said circuits, two impedances respectively connected between the star points of said windings and ground, and means dependent upon the current through one of said impedances for establishing a low impedance circuit between ground and the star point to which the other impedance is connected.

13. In combination, two polyphase circuits, two star-connected mutually-coupled windings respectively connected to said circuits, two impedances respectively connected between the star points of said windings and ground, and means dependent upon the current through one of said impedances for establishing in a predetermined sequence low impedance circuits between said star points and ground.

SHERMAN B. FARNHAM.